United States Patent Office 3,249,840
Patented May 3, 1966

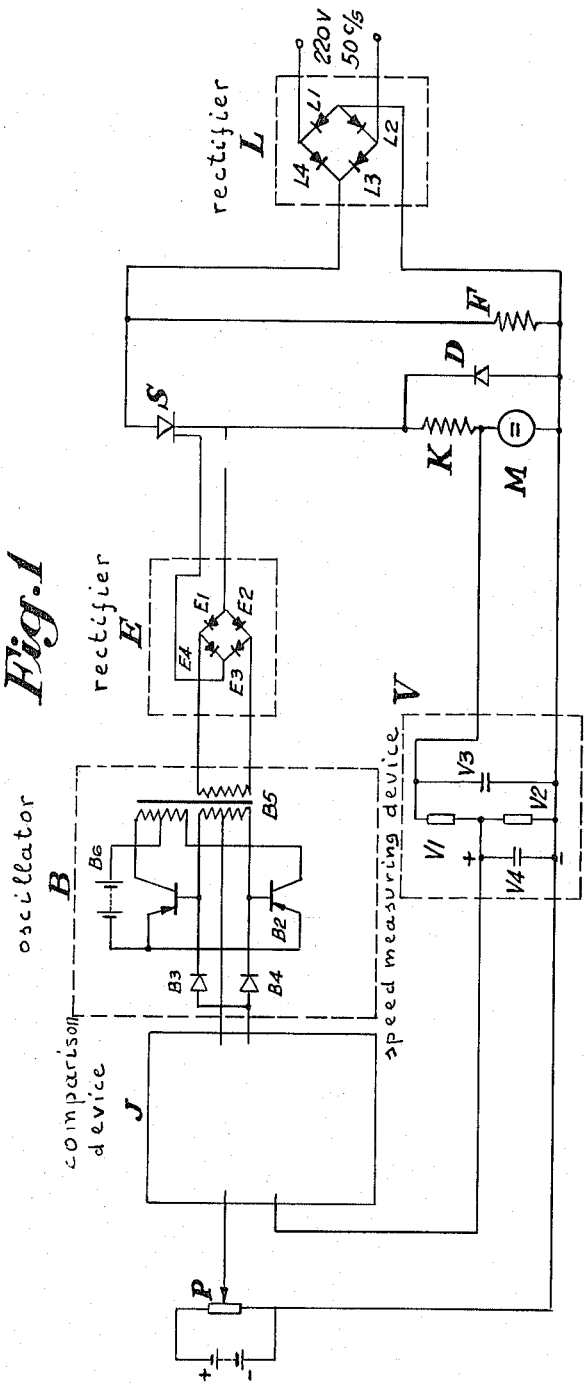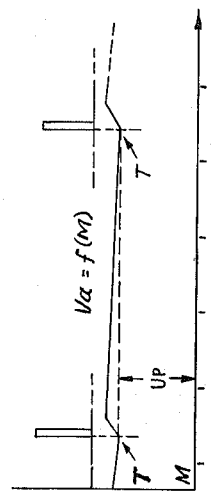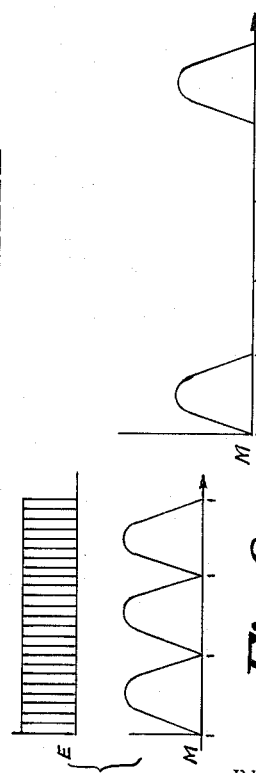

3,249,840
SPEED CONTROL DEVICE RESPONSIVE
TO COUNTER E.M.F.
Erik Einar Eriksson and Johan Olof Tegström, Gullanget, Ornskoldsvik, Sweden, assignors to Aktiebolaget Hagglund & Soner, Ornskoldsvik, Sweden
Filed Feb. 20, 1962, Ser. No. 175,868
Claims priority, application Sweden, Feb. 27, 1961, 2,084/61
3 Claims. (Cl. 318—331)

The present invention relates to a method of adjusting a magnitude to be controlled, for example the speed of a motor, in accordance with a desired value in the form of a selectable voltage. In addition the invention relates to an apparatus for performing the said method.

The method according to the invention is characterised in that the said magnitude to be controlled is compared with a voltage produced by a motor which is fed with pulsating direct current via a controlled current valve which is opened to current flow by means of a pulsating control voltage produced when an unbalance occurs between the voltage produced by the motor and the said selectable voltage.

The invention is described in greater detail in connection with the accompanying drawing FIGURE 1 of which is a diagram of a control apparatus according to the invention. FIGURES 2, 3 and 4 are diagrams showing different electrical waves.

A D.C. motor having an armature M, separately excited field winding F, commutating winding K and a controlled rectifier or current valve S connected in series in the armature circuit is fed by a full wave rectifier L connected to for example a 50 c.p.s. A.C. net. The rectifier L is of the type well known in the art and consists of four rectifying cells $L_1$ to $L_4$ in a bridge connection. By influencing the number per second of D.C. waves supplied to the armature M of the motor by means of the controlled current valve S the speed of the motor is controlled. Since the moment of inertia of the armature is relatively large and the D.C. waves are smoothed somewhat by the time constant caused by the inductance of the winding K together with the resistance of the armature circuit the speed of the motor and consequently the desired control accuracy will not be affected and disturbed by a single one of the pulses supplied to the armature M from the rectifier L but only by the pulses as a whole. In order however to be able to achieve increased control accuracy the frequency of the control voltage supplied to the current valve S is made many times greater than the frequency of the D.C. waves. A suitable frequency for the control voltage is 800 c.p.s. so that even parts of a single D.C. wave may be controlled.

The choice of the desired motor speed is made by adjusting a voltage divider P, for example a potentiometer, connected to a D.C. source. The adjusted voltage corresponding to the desired value of the revolutions is fed to a comparison device J, where this voltage is compared with a voltage from a speed measurement device V corresponding to the speed of the motor armature M, the device V being connected to the armature M and consisting of a potentiometer circuit combined with a filter. Actually the speed measuring device V is the usual voltage divider having two resistances $V_1$ and $V_2$ which receive current from the motor armature M, for example 190 volt, whereby the resistance $V_2$ supplies a measuring voltage of only a few volts which is proportional to the r.p.m. of the motor. The filter used to eliminate the upper waves of the armature current consists of a condenser $V_3$ at the inlet side and a condenser $V_4$ at the outlet side. When the speed voltage from the device V is not in equilibrium with the correct value set at P, the equilibrium being sensed in the device J by means of a transistorised measurement circuit, a self-oscillating square wave oscillator B is started, the frequency of the oscillator B being 400 c.p.s. at the above mentioned example of 800 c.p.s. for the control voltage. The transistorised measuring circuit of the device J comprises a transistor $J_1$, three resistances $J_2$, $J_3$ and $J_4$ and a voltage source $J_5$. When the voltage of device V is equal to that of divider P—the voltages being opposed, the voltage at the inlet of the device J is zero and thus the voltage at the outlet of the device J is also zero, so that the generator B is at a standstill.

If, however, the voltage of the device V drops below the voltage set by the divider P, i.e. when the speed of the motor has dropped, there is a voltage difference at the inlet of the device J which corresponds to the difference between the voltages of the divider P and the device V. This positive voltage difference $(P-V)$ produces a correspondingly increased voltage at the outlet of the device J and thus at the inlet of the generator B, so that the generator B is actuated.

It may be noted that it is possible to eliminate the device J entirely and to operate the generator B directly by the voltage difference $(P-V)$. However, the use of the device J has the advantage that the apparatus is made more sensitive, so that the generator B is operated even when the positive voltage difference $(P-V)$ is very small; thus the regulation of the speed of the motor M is made much more precise.

The oscillator or generator B is of the usual type and comprises two transistors $B_1$ and $B_2$, two coupling diodes $B_3$ and $B_4$, a transformer $B_5$ and a voltage source $B_6$. As is well known, by the use of suitable operational voltages the oscillator B may be made to produce voltages of square wave form.

However, it is not absolutely necessary to produce square waves, since other wave shapes can be used. In general, any oscillation generator of known construction, such as one with electronic tubes, can be used. It is important, however, that the oscillation frequency of the generator B be greater than the frequency of the current feeding the rectifier L, i.e. the current for the motor M. In the example described herein the net frequency is 50 c./s., the frequency of the motor current is thus double, namely, 100 c./s. and the generator frequency of the oscillator B is 400 c./s. The alternating voltage from the oscillator B is supplied to a full wave rectifier E, which converts the 400 c.p.s. voltage into said 800 c.p.s. control voltage, which, when unbalance occurs between the voltage from P and from V, is supplied to the control electrode of the rectifier S. The full wave rectifier E consists of four rectifier cells $E_1$ to $E_4$; its purpose is to rectify in the usual manner all half-waves of the generator B, so that the frequency of the generator B of 400 c./s. is changed into a frequency of 800 c./s. Furthermore, by this arrangement only positive half waves are transmitted to the control electrode of the rectifier S. The control voltage opens the current valve S for current flow from the rectifier L to the motor armature M, whereupon the armature current and consequently the motor speed also increases until there is equilibrium between the compared voltages at P and V—that is until the motor speed corresponds to the desired value set at P. When equilibrium is reached the oscillations of the oscillator B cease, and the control voltage on the control electrode of the control valve S becomes equal to zero. The conductivity of the current valve S is then cancelled with the result that the motor speed falls, which in its turn results in a renewed unbalance between the voltage from V and the desired value set at P, so that recommencement of the oscillator B occurs, whereupon a new control voltage is supplied to the current valve S. This results in the motor again being fed with current from the rectifier L, whereby the motor speed increases to the desired value. This course of events is repeated at short intervals. The reduction and increase of the motor speed is extremely small and of short duration so that the motor may be considered to rotate at a constant speed.

If the conductivity of the control rectifier is cancelled and when the armature current is broken, the inductive energy of the winding K and armature M generates an undesirable induction voltage with reversed polarity. This voltage is eliminated by means of a diode D connected across the part of the current circuit consisting of the armature M and winding K. The diode D has in addition the advantage that current changes in the armature M are made as slowly as possible.

The speed measurement device V based on the E.M.F. arising across the armature M simultaneously senses the ohmic voltage drop in the armature M which in itself means a certain mis-measurement, which in particular at fairly low speeds acquires significance. Since however the armature current always passes zero between two D.C. waves, thereby causing a pause, the ohmic potential drop R.I. at this instant is equal to zero so that the E.M.F. voltage influencing the comparison device J is free from any component arising from said ohmic potential drop. Compensation for this potential drop is as a result of this not necessary.

Thus the operation of the control apparatus of the present invention may be again summarized as follows:

As shown in FIG. 2, the current in the armature M of the motor has the shape of positive half-waves with a frequency of 100 c./s. (two times 50 c./s.). This current flows during starting, i.e. when the motor is accelerated from standstill to its full speed. FIG. 2 also shows that the voltage E of the generator B after it was rectified in the rectifier E, has the shape of rectangular half waves with a frequency of 800 c./s., so that eight rectangular impulses correspond to one half wave of the motor current.

When the motor has reached its prescribed speed, which is set by the potentiometer P, the voltage difference $P-V$ becomes zero or becomes negative when V is greater than P, so that the generator B stops and the current valve S is closed. A positive voltage difference at the inlet of the comparison device J is produced only when the speed of the motor drops below the preset value, and then generator B is actuated. Then a single impulse of the armature current, i.e. a single half-wave, is sufficient to bring the motor back to its prescribed speed. After a certain time lapse the speed will drop again and then a new current impulse is produced by the armature current, and so forth. This is illustrated in FIG. 3. It is assumed that the load of the motor is such that one half-wave after a pause corresponding to the duration of three half-waves, will suffice to provide an oscillation about the prescribed speed of the motor.

While FIG. 3 shows the impulses of the motor current, FIG. 4 shows the E.M.F. voltage which exists at the armature at the same time. It is apparent that the E.M.F. voltage of the armature $U_a=f(M)$ is slightly increased during the current impulses corresponding to the speed of the motor armature and then drops gradually during the pauses between the impulses when the motor armature "runs out." Every time when the armature voltage has reached the voltage $U_p$ set by the potentiometer P, i.e. when it has dropped to that voltage or is only slightly different therefrom, a positive voltage difference $P-V$ appears at the inlet of the comparison device J, and the generator B appears during the existence of sufficient positive When the first rectangular impulse produced by the generator B appears during the existence of sufficient positive voltage through the current valve S (as was assumed to be the case in FIG. 4), a single rectangular impulse from the generator B will suffice to energize the current valve S and to open it, so that it will allow the passage of a half wave for the motor armature. After the first rectangular impulse from the generator B the voltage may be equalized again or there may be a negative voltage difference between V and P, so that the generator B is brought to a standstill, i.e. the current valve S will be deenergized when the armature current becomes zero. If then the speed of the motor begins to drop gradually, the entire procedure will be repeated.

FIG. 4 shows that the armature voltage $U_a$ during the pause between the two current impulses (FIG. 3) is the pure E.M.F. voltage of the armature and is not affected by the voltage produced by the ohmic resistance of the armature and the armature current, since during that pause the armature current is zero and thus the voltage drop $R \times I=0$. This shows that in accordance with the present invention the speed of the motor is regulated independently of its load.

The described control principle is of course also applicable to any measurement magnitudes, for example current, voltage, etc., which are to be controlled. The relationship between the maximum and minimum value of the controlled magnitude may with this control apparatus be made fairly large, for example the speed with the above described motor control apparatus may be varied from about 0 to 1500 r.p.m. or higher speeds. The control accuracy achieves a value of greater than 1%.

What we claim is:

1. An apparatus for adjusting a magnitude to be controlled, for example the speed of a motor, comprising a D.C. motor armature, a controlled current valve, a feed current source connected to said current valve, a voltage comparison device, said current valve having a control electrode connected to said armature, a generator for pulsating control voltage, means connecting said control electrode of the current valve to said generator and said voltage comparison device, and signal transmitting means connected with said armature and said voltage comparison device, the generator being adjusted to be put in operation by a signal from the voltage comparison device, wherein the feed current source of the armature is an A.C. source, which has a lower frequency than the generator.

2. An apparatus for adjusting a magnitude to be controlled, for example the speed of a motor, comprising a D.C. motor armature, a controlled current valve, a feed current source connected to said current valve, a voltage comparison device, said current valve having a control electrode connected to said armature, a generator for pulsating control voltage, means connecting said control electrode of the current valve to said generator and said voltage comparison device, and signal transmitting means connected with said armature and said voltage comparison device, the generator being adjusted to be put in operation by a signal from the voltage comparison device, comprising a diode, the armature being connected in parallel with said diode to eliminate induction voltages which have reversed polarity and which arise when the current is broken by the control valve.

3. An apparatus for adjusting a magnitude to be controlled, for example the speed of a motor, comprising a D.C. motor armature, a controlled current valve, a feed current source connected to said current valve, a voltage comparison device, said current valve having a control electrode connected to said armature, a generator for pulsating control voltage, means connecting said control electrode of the current valve to said generator and said voltage comparison device, and signal transmitting means connected with said armature and said voltage comparison device, the generator being adjusted to be put in operation by a signal from the voltage comparison device, wherein the generator is a full-wave rectifier and an A.C. generator connected therewith and adapted to be started by said signal, wherein the comparison device comprises transistors and is adapted to supply said signal in the form of a starting voltage to the A.C. generator.

(References on following page)

References Cited by the Examiner

UNITED STATES PATENTS

| | | | |
|---|---|---|---|
| 2,325,092 | 7/1943 | Andrews | 318—331 |
| 2,546,014 | 3/1951 | Puchlowski | 318—331 XR |
| 2,778,982 | 1/1957 | Loeffler | 318—331 |
| 2,809,338 | 10/1957 | Carlson | 318—345 |
| 2,847,632 | 8/1958 | Harvey et al. | 318—345 |
| 2,977,523 | 3/1961 | Cockrell | 318—331 |
| 3,041,478 | 6/1962 | Gabor | 318—345 |
| 3,064,174 | 11/1962 | Dinger | 318—331 |

ORIS L. RADER, *Primary Examiner.*

J. C. BERENZWEIG, R. C. COOKE,
*Assistant Examiners.*